(12) United States Patent
Raman et al.

(10) Patent No.: US 9,807,076 B2
(45) Date of Patent: Oct. 31, 2017

(54) NETWORKED SCORE COMMUNICATIONS SYSTEM

(71) Applicant: SAP SE, Walldorf (DE)

(72) Inventors: Gururaj Raman, Heidelberg (DE); Boris Krems, Reichautshausen (DE)

(73) Assignee: SAP SE, Walldorf (DE)

( * ) Notice: Subject to any disclaimer, the term of this patent is extended or adjusted under 35 U.S.C. 154(b) by 145 days.

(21) Appl. No.: 15/043,632

(22) Filed: Feb. 15, 2016

(65) Prior Publication Data

US 2017/0237722 A1    Aug. 17, 2017

(51) Int. Cl.
  *H04L 29/06* (2006.01)
  *H04W 12/06* (2009.01)
  *G06F 17/30* (2006.01)

(52) U.S. Cl.
  CPC .......... *H04L 63/08* (2013.01); *G06F 17/3053* (2013.01); *H04L 67/42* (2013.01); *H04W 12/06* (2013.01)

(58) Field of Classification Search
  None
  See application file for complete search history.

(56) References Cited

U.S. PATENT DOCUMENTS 6,904,520 B1 * 6/2005 Rosset ................... G06Q 20/10 379/123
8,639,214 B1 * 1/2014 Fujisaki ............... H04M 11/007 379/88.03

(Continued)

FOREIGN PATENT DOCUMENTS

EP          2922013 A2 * 9/2015 ............ H04L 29/06
WO    WO 2014/179690    11/2014

*Primary Examiner* — Christopher Revak
(74) *Attorney, Agent, or Firm* — Harness, Dickey & Pierce P.L.C.

(57) ABSTRACT

The disclosure relates to a telecommunication method for communicating scoring data over a network, comprising: sending, by a client application of a mobile telecommunication device, a request to a remote system via the network, the request comprising a user-ID of a user authenticated to the client application; in response to receiving the request, computing request-triggered, time-stamped scores selectively for physical objects assigned to the user; and selectively in case one of the current request-triggered scores differs from a request-triggered score computed in response to the last request of the same user for the same organization and the same physical object, returning the current and the previously computed request-triggered scores to the client application; regularly and independent of receiving the request, computing, by the remote system, scheduler-triggered, time-stamped scores of a plurality of physical objects irrespective of the user said physical object are assigned to, and comparing each scheduler-triggered score with the request-triggered score computed most recently for the same organization and the same physical object; upon determining that one of the scheduler-triggered scores differs from the most recently computed request-triggered score computed for said user for the same organization and physical object, sending a message from the remote system to another application running on the mobile telecommunication device, the message comprising the one computed score or an indication of a score change.

14 Claims, 5 Drawing Sheets

(56) References Cited

U.S. PATENT DOCUMENTS

| | | | |
|---|---|---|---|
| 9,159,095 B1* | 10/2015 | Smith | G06Q 30/0641 |
| 2002/0088816 A1* | 7/2002 | Vaitkus | G07F 7/02 |
| | | | 221/9 |
| 2012/0233665 A1* | 9/2012 | Ranganathan | G06F 21/33 |
| | | | 726/4 |
| 2014/0006236 A1* | 1/2014 | Nitschke | G06Q 30/04 |
| | | | 705/34 |
| 2015/0084745 A1* | 3/2015 | Hertz | H04W 4/02 |
| | | | 340/10.3 |
| 2015/0195274 A1* | 7/2015 | Lee | H04W 12/06 |
| | | | 713/156 |
| 2016/0162959 A1* | 6/2016 | Merkel | G06Q 30/0283 |
| | | | 705/400 |
| 2017/0195359 A1* | 7/2017 | Grigoryan | H04L 63/1433 |

* cited by examiner

NETWORKED SCORE COMMUNICATIONS SYSTEM

FIELD OF THE INVENTION

The invention relates to telecommunication systems, and more particularly to the use of telecommunication systems for score communication.

BACKGROUND AND RELATED ART

Reliably delivering applications and data to mobile workers over networks is an issue for many organizations and companies with field operations ranging from mobile repair and maintenance services to field-based sales. Implementing fully connected mobility (real-time access) is considered very important in order to ensure worker productivity (first-visit service-call completion), fast and reliable service resolution, cost control and revenue opportunities. Giving field personnel more timely access to technical and/or customer-related data managed by a backend system, e.g. a CRM system or a technical knowledge base allows them to increase productivity. This requires reliable and stable network connections.

For example, a company may have sold complex machines (e.g. microscope systems, complex biomedical devices, machines used in an automated production line, etc) to a plurality of customers and may employ assembly, operational and maintenance personnel that are highly technically qualified and trained for repairing and maintaining said complex machines at the customer's site. The machines may automatically send status information and error codes to a backend system maintained by the company. The backend system may constantly monitor and evaluate the status information and/or error codes for computing scores being indicative of what kind of actions to perform by the assembly, operational and maintenance personnel in order to install, test or repair a complex machine.

According to another example, the score values provided by the backend system may be technical parameters for configuring the operation of the machine. For example, the backend system may monitor the number, state and/or availability of consumables and production resources and automatically compute scores for said consumables and production resources which may increase or diminish the relative amount of said resources or consumables used by the machine for producing some goods or performing some analytical tests as to reduce costs or optimize technical parameters of the produced goods, e.g. mechanical durability, weight, elasticity or others.

Service information such as parts availability or repair tips may need to be checked at the customer's site for faster problem resolution. Updating service tickets in the field may enable call center-based service representatives to give real-time status reports. Poor cellular network and technology performance in the field may result in longer downtimes, reduced productivity and even erroneous decisions or sales offers created by the field personnel.

However many technical problems exist in respect to providing field-based employees with reliable access to information maintained in the backend systems: at a customer's site there may be no or only an instable connection to the mobile network; moreover, the mobile devices of field personnel tend to have comparatively small displays (smartphones, tabloids, net books, etc) and therefore the handling of client applications which request score information from the backend system and which display the score information on the display of the mobile device may be difficult.

For example, touch screens of smartphones are often not suited for quickly entering large amounts of data. In addition, the data provided by the backend system is often confidential, but protecting it by additional authentication procedures and requirements may reduce the productivity of the field-based employees. Moreover, there is a risk that the data having been already received by a field-based employee from the backend-system has become outdated, but a frequent refresh rate might consume battery power and thus might reduce the battery life time.

SUMMARY

It is an objective of the present invention to provide for an improved telecommunication system, method and computer program product for communicating scores over a network to a mobile telecommunication device as specified in the independent claims. Embodiments of the invention are given in the dependent claims. Embodiments of the present invention can be freely combined with each other if they are not mutually exclusive.

A "database management system" (DBMSs) is a specially designed software and/or hardware based application that is designed to al-low the definition, creation, querying, updating and administration of one or more databases. Typically, a DBMS is operable to interact with a user, with other applications, and one or more databases managed by the DBMS to process some requests and to analyze data. A DBMS may allow the definition, creation, querying, update, and administration of databases. Well-known DBMSs include MySQL, MariaDB, PostgreSQL, SQLite, Microsoft SQL Server, Microsoft Access, Oracle, SAP HANA, dBASE, FoxPro, IBM DB2, and others.

A "database" as used herein is a collection of electronic information that is organized in memory or on a non-volatile storage volume in the form of a particular, defined data structure. Preferentially, said structure supports or is optimized for data retrieval by a particular type of database query, e.g. an SQL query.

A "data record" as used herein is a data item that comprises one or more attributes of an object, e.g. of a physical object or an organization.

A "score" as used herein is a numerical value that indicates a property of a data record either in absolute or in relative terms. A score can be, for example, an integer or floating point number. It can represent, for example, a scale value of a technical scale (e.g. temperature, pressure, degree of wear and tear), a percentage value, a status of a machine, the number of physical objects still present in a consumables container of a machine, a price, or the like.

A request-triggered score is a score whose computation or retrieval from a database is triggered by the receipt of a request. A scheduler-triggered score is a score whose computation or retrieval from a database is triggered regularly and independently of the receiving of a score-related request by a scheduler.

"Log-in data" as used herein is data provided by a user to an application program in order to authenticate to the application program. The log-in data can comprise, for example, a PIN, a password, biometric data of the user, e.g. a fingerprint, or the like.

A "client application" is a computer program designed to perform a group of coordinated functions, tasks, or activities for the benefit of the user. According to embodiments, the client application is an application with customized functions and a customized GUI particularly suited for managing, requesting and displaying scores of physical objects and additional data associated with physical objects.

A "remote system" as used herein is a distributed or monolithic computer system that is operatively coupled to the client application program via a network. For example, the remote system may be a single server computer or a set of interoperable server computers, e.g. a set of computer in a cloud environment.

In one aspect, the invention relates to a telecommunication method for communicating scoring data over a network.

A client application of a mobile telecommunication device sends a request of a user to a remote system via the network. The request comprises a user-ID of the user having authenticated to the client application. The user is one of a plurality of users registered by the remote system.

In response to receiving the request, the remote system identifies one or more organizations and one or more physical objects assigned to the user-ID of the user. The user is one of a plurality of users registered by the remote system. The remote system computes current, request-triggered scores selectively for each of the identified physical objects, thereby storing a timestamp in association with each computed score. Selectively in case one of the current request-triggered scores differs from a request-triggered score computed in response to the last request of the same user for the same organization and the same physical object, the remote system returns both the current and the previously computed request-triggered scores to the client application via the network.

The client application displays to the authenticated user both the current and the previous request-triggered score.

The remote system regularly and independent of receiving the request computes scheduler-triggered scores of a plurality of physical objects irrespective of the user said physical object are assigned to. Thereby, the remote system sores a timestamp in association with each scheduler-triggered score. Then, the remote system compares each scheduler-triggered score with the request-triggered score computed most recently for the same organization and the same physical object and for each of a plurality of users registered at the remote system.

Upon determining that one of the scheduler-triggered scores differs from the most recently computed request-triggered score computed for said user for the same organization and physical object, the remote system sends a message to another application running on the mobile telecommunication device. The message comprises the one scheduler-triggered score or an indication of a score change.

In response to receiving the message, the other application indicates that a score change occurred to the user irrespective of whether the user is currently authenticated to the client application. The indication may be implemented, for example, by displaying a notification that the score has changed and/or outputting a sound signal, e.g. a voice message and/or outputting a vibration signal (via the mobile telecommunication device, e.g. a smartphone supporting a vibration functionality.

Said features may be advantageous because a secure and at the same time highly convenient way of communicating score information is provided: two independent communication channels for communicating score information to the user, e.g. a field-based employee, are used: the first communication channel provides score information selectively to a user having authenticated at the client application. Thus, a user not having access permissions to the client application will not be able to submit the request with the user-ID and will not receive any score data in response to the request. The second communication channel via the other application does not require the user to log into the client application. However, the second communication channel selectively sends the score change notification to registered users. Thus, provided that the registration process is safe and the address information of the other application provided to the remote system during the registration process is correct and up-to-date, only the registered user will be informed on a score change.

The first communication channel is mainly used for exchanging request-related score information while the second communication channel is mainly used for communicating score change events irrespective of whether the user is currently logged in the client application that is "normally" used for requesting and monitoring the scores. For example, the client application may be a customized application with a customized GUI for displaying score details or displaying technical and other data including the scores.

Moreover, the method is fast and reduces network traffic as only the scores of physical objects assigned to the particular user are returned to the client application. As the regular check for score change events is executed by the remote system autonomously and independent of a request, there is no need for regular score requests by the client application. This reduces the total number of requests and the total amount of data that needs to be exchanged via the network for ensuring the field-based employee receives up-to-date score information: if the user has authenticated (logged-in) to the client application, current score information may be requested from the server.

The remote system "knows" the score information having been communicated to the client application upon a user's previous request, e.g. upon the user's previous log-in action to the client application. The remote system may not return any score information in case the already communicated scores are up-to-date. This may further reduce network traffic.

Moreover, the user is not required to log into the client system multiple times a day to ensure that the score information is up to date when he or she reaches a particular organization, e.g. a particular customer. This may reduce power consumption, because the fewer applications are instantiated on the mobile telecommunication device, the lower the energy consumption and the higher the battery lifetime. The user can rely on being actively and immediately (via a push service) informed via the other application (which may run on the mobile telecommunication device anyway, e.g. a social network client or a mail client) in case the score of a physical object assigned to said user has changed in the backend system.

Instantiating many applications (the other application and in addition the client application) on the mobile telecommunication device may reduce the productivity of the employee also because the user has to switch between multiple different programs which may not easy to handle on a small device such as a smartphone. By relying on the push-service for being notified of any score changes in the backend-system, the user is required to instantiate and authenticate at the client application only rarely when really necessary. This will reduce power consumption of the mobile device, will reduce network traffic by avoiding the login-triggered sending of score requests for being informed on score changes and will also increase the productivity of the field-based employees.

According to some embodiments, in case none of the current request-triggered scores differs from the request-triggered score computed in response to a previous request of the same user for the same organization and the same physical object, the remote system selectively returns the current request-triggered scores to the client application via the network. Alternatively, the remote system in this case selectively returns an indication that the score of a particular physical object has not changed. This may reduce network traffic.

According to embodiments, the client application is configured for caching a plurality of request-triggered scores received from the remote system in response to a plurality of requests. For example, the client application is configured to cache its assigned time stamp having been received by the client application from the remote system after the last log-in action of the user to said client application. In one of said embodiments, the remote system does not even return the computed scores.

Rather, the remote system returns an indication that the score has not changed and that the last-log-in score cached by the client application can be re-used. This may further reduce network traffic between the client application and the remote system.

In response to receiving the indication that the request-triggered score of a particular physical object has not changed, the client application displays the cached request-triggered scores of said physical object. The caching of scores by the client application may further reduce the network traffic.

According to embodiments, the other application is accessible to the user without requiring the user to authenticate to the other application. For example, the other application may not require the user to perform a log-in action before granting the user access to its functions. The other application may be, for example, a browser such as Firefox, Internet Explorer or Chrome, a mail client or the like. The other application may also be a client application for a social media service, e.g. a client for a social network like face book or a company-internal social media service. Preferentially, the other application is an application that is typically instantiated and running on the mobile telecommunication device as it is necessary for the normal working routines of the user. This may have the advantage that the user is not forced to instantiate and log-in to the client application in order to be notified—in response to explicit requests—of any score changes. Rather, thanks to the other, push-service based communication channel, instantiating and running the other application may be sufficient for ensuring that the user is notified of score changes. Time is saved as the user is not required to enter log-in credentials for the other application for being notified of a score change via said other application.

According to embodiments the request is submitted by the client application selectively upon the user having successfully authenticated to the client application or upon an (explicit) user-action that causes the client application to request current score information from the remote system. The user-action may be, for example, the selection of a GUI element of the client application, e.g. a button or a drop down menu item that triggers the sending of the request to the remote system. Thus, the current score is computed and returned to the client device selectively in case of a log-in event or an explicit user action, thereby reducing network traffic as the client application is configured not to automatically and/or regularly send score requests to the remote system.

According to embodiments, the computation of the current request-triggered scores comprises computing an aggregate score for each of a plurality of physical object item numbers. The computed aggregate scores non-linearly correlate with the number of physical object items for which the score is aggregated. The returning of the current and most recently computed request-triggered scores to the client application comprising returning, for each of the physical object item numbers, the respectively computed current and most recently computed aggregate score. In some embodiments, the physical object item numbers, i.e., the item numbers of physical objects for which an aggregate score shall be computed and returned to the mobile telecommunication device, may be predefined in the remote system or may be received together with the user-ID from the client application. In the latter case, the item numbers may be predefined in the client application and/or may be specified manually by the user.

A "physical object item" as used herein is a physical entity associated with a particular physical object, whereby the number of physical object items is used as input for computing the aggregated score of the physical object to which said physical object items are assigned. The aggregated score depends on the number of physical object items.

According to embodiments, the number of physical object items is the number of instances of a particular physical object for which a particular service shall be provided. For example, a technical service company may have a contract with another company to regularly inspect a number of M machines at a particular production site. Each of said machine instances may correspond to a physical object item instance and may respectively indicate a number of consumables that need to be replenished till a particular bar date. A total aggregate score may indicate the total amount of consumables that a field-based maintenance worker needs to bring along at his next visit. In this embodiment, each object item instance corresponds to a physical object instance.

According to other embodiments, the physical object instances associated with a physical object correspond to components of the physical object, e.g. to individual machine parts which may have assigned individual status information. The status information of all components of a machine may be used for computing the aggregate score of the machine.

In still other embodiments, the physical object instance numbers correspond to different numbers of a particular product offered to a particular customer. For example, the volume discount for 10.000 offered products may be higher than for 1.000 offered products. Consequently, the corresponding aggregated score value, i.e., the total price, may be lower per individual product for a 10.000 item order than for a 1.000 item order. For example, the score computation for a particular physical object, e.g. a machine of type A, may be computed for 1 physical object item (e.g. one machine of type A), for 50 physical object items (e.g. 50 machines of type A), and for 100 physical object items (e.g. 100 machines of type A). According to another example, the score computation for a particular physical object, e.g. a machine of type B, may be computed for 1 physical object item, for 3 physical object items, for 5 physical object items and for 10 physical object items (e.g. for 1, 3 or 5 machines of type B). The item numbers and association with one or more physical object items with a particular physical object depend on the respective use case scenario.

The client application receives the scores having been computed by the remote system for each of the item numbers and displays the returned aggregated scores for each of the physical object item numbers to the user authenticated to the client application. The computation of a plurality of scores for different item numbers may be advantageous, as it allows the field-based employee to receive scores that may be computed in a very complex and non-linear manner without sending multiple individual requests for each of a plurality of different item numbers.

According to embodiments, the request further comprises an organization-ID. The request-triggered and the scheduler-triggered scores are computed as organization-specific scores. The request-triggered scores are computed and returned to the client application selectively for physical objects assigned to the organization whose ID is contained in the request.

For example, the organization-ID may be an ID of the organization the user is currently visiting in his function as field-based employee. This may further reduce the data traffic via the network, because only scores specifically assigned to the user and being in addition assigned to physical objects associated with a particular organization identified by said organization-ID are computed and returned to the mobile telecommunication device.

For example, the scores may be a technical parameter that determines the energy consumption, output rate and/or life expectancy of a particular type of manufacturing machine having been sold to a plurality of customers or may be a derivative value computed from one or more technical parameters. The remote systems may have different scoring schemes for the different customers for computing machine scores that and/or for automatically minimizing energy consumption or maximize output rate or maximize the life expectancy of the machines by evaluating one or more score values and applying a control—or maintenance routine in dependence on the score value. This may allow a customized configuration and operation of the machine as to optimally conform to the requirements of the company operating the machine. By including the organization-ID in the request, an appropriate score calculation scheme that is customized for the specific needs of said customers can be automatically used for score computation. To give a concrete example, a score may indicate a date when a machine requires technical review and inspection which may depend at least to a small extend on the maintenance strategy of the company operating and using the machine.

According to other embodiments, the score may be a price of a good to be offered and sold to a specific organization and the organization-specific price may depend on an organization-specific discount.

According to embodiments the request further comprises an organization-ID. The remote system performs in response to receiving the request the following operations:

identifying one or more further physical objects assigned to the organization-ID in the request, the further physical objects being unassigned to the user-ID in the request;

retrieving a score change history for each of the identified further physical objects; the history is data, e.g. a file or a set of data records being indicative of all request-triggered and scheduler-triggered scores having been computed for a particular physical object in the past; and returning each of the retrieved score change histories via the network to the client application.

The client application displays each of the score change histories received from the remote system by the client application on a display of the mobile telecommunication device.

Said features may be advantageous as a user-independent but organization-dependent score history for one or more physical objects associated with said organization is received and displayed by the client application. Thus, a field-based employee visiting a particular customer may not only receive score data for physical objects he is responsible for (e.g. machines of type A this user has special knowledge of) but may in addition receive score information for other physical objects (e.g. machines of type B his colleague has special knowledge of) that are not assigned to said user. Thus, a field-based employee may automatically receive also score history information for physical objects he or she does normally not deal with but which are relevant for the organization currently visited. This information may help the field-based employee to represent a colleague during vacation. This information may also help the field-based employee to get a rough overview of the score values of physical objects for which normally a colleague is responsible for as in some circumstances this information may ease to solve a technical problem associated with a physical object assigned to said employee.

For example, the employee may be responsible for maintenance and repair of machines of type A but not of machines of type B. The machines of types A and B may be interoperable and the diagnosis and/or correction of a fault of machine A may require knowledge of some score values, e.g. some technical parameters and configuration parameters of machine B. In some embodiments, the score may represent parameters being shared by all instances of a given physical object type. In some other embodiments, the score may indicate properties, e.g. configuration parameters, measured state parameters or the like which are particular to a particular physical object instance, e.g. a particular machine installed at a particular customer according to the specific requirements of said customer.

According to embodiments, the remote system comprises a first scheduling module being configured to regularly and independent of the receiving of the request triggering the computing of the scheduler-triggered scores for all physical objects assigned to any one of the plurality of registered users and comparing each computed scheduler-triggered score with the request-triggered score computed in response to the most recent request of each of the registered users, including the user from which the request was received, for the same organization and the same physical object.

In addition or alternatively, the remote system further comprises a second scheduling module configured for regularly and independently of the receiving of the request triggering the computing of the scheduler-triggered scores for creating the score histories for all physical objects assigned to any one of the plurality of registered users.

Preferentially, the first scheduling module has a higher triggering frequency than the second scheduling module.

Using two independent trigger mechanisms may have the advantage that network traffic is reduced. For example, it may be very important for a field-based employee to be informed immediately about any score change of a physical object he or she is responsible for. In addition, there may be hundreds of physical objects not being assigned to said employee whose score history nevertheless may support the work of the employee or which may be relevant in case of a vacation representation of a colleague. By using different trigger mechanisms, e.g. an hourly or daily trigger for the scores of assigned physical objects and a weekly or monthly trigger for score histories of all physical objects, network traffic may be reduced and computational resources of the mobile telecommunication device may be saved as the score changes of physical objects will be detected and stored in the history for all physical objects managed by the remote system irrespective of their respective assignment to a user but a score change will only be communicated to a user via the network in case the score change affects a user having subscribed to said particular physical object and having received in response to a previous request a meanwhile outdated score value.

According to embodiments, scores and score changes stored in the history of a particular physical object are communicated in response to a user's request submitted via the client application not only for physical objects to which said user has subscribed but also for physical objects which are assigned to the organization the user is currently visiting or plans to visit and for which said user has not subscribed. Said physical objects could be considered as "Unassigned but relevant" physical objects of a particular user.

According to embodiments the computation of the request-triggered and/or scheduler-triggered scores and/or the computation of the aggregate scores is performed in real time.

According to embodiments the client application is configured to automatically determine the size of the display of the mobile telecommunication device. The client application displays or hides one or more GUI elements of a GUI of the client application in dependence on the determined size. For example, the client application may display score history diagrams for one or more physical object in case the client application determines that it runs on a tabloid or notebook. The client application hides the score history diagrams in case the client application determines that it runs on a smartphone.

Said features may be advantageous as the user does not have to familiarize with different client application programs when using different client devices, e.g. a desktop computer, a tabloid and/or a smartphone for requesting current score information. Rather, the client application may automatically adapt to the display size of the respective client device, thereby enabling the user to work with the same client application on many different client device types.

In a further aspect, the invention relates to a computer-readable storage medium comprising computer-interpretable instructions which, when executed by processors of a mobile telecommunication device and a remote system cause the mobile telecommunication device and the remote system to perform a method according to any one of the embodiments described herein.

In a further aspect, the invention relates to a distributed system comprising a mobile telecommunication device hosting a client application and another application. The distributed system further comprises a remote system connected to the mobile telecommunication device via a network, e.g. the Internet. The client application is configured to send a request of a user to the remote system via the network. The request is configured to perform, in response to receiving the request, the following operations:

identifying one or more organizations and one or more physical objects assigned to the user-ID of the user, the user being one of a plurality of users registered by the remote system;

computing current request-triggered scores selectively for each of the identified physical objects, thereby storing a timestamp in association with each computed score;

selectively in case one of the current request-triggered scores differs from a request-triggered score computed in response to the last request of the same user for the same organization and the same physical object, returning both the current and the previously computed request-triggered scores to the client application via the network.

The client application is configured to display both the current and the previous request-triggered score returned in response to the request of the authenticated user.

The remote system is configured to regularly and independently of receiving the request performing the following operations:

computing scheduler-triggered scores of a plurality of physical objects irrespective of the user said physical object are assigned to, thereby storing a timestamp in association with each scheduler-triggered score, and comparing each scheduler-triggered score with the request-triggered score computed most recently for the same organization and the same physical object irrespective of the user to which said physical object is assigned;

upon determining that one of the scheduler-triggered scores differs from the most recently computed request-triggered score computed for the user for the same organization and physical object, sending a message from the remote system to another application running on the mobile telecommunication device, the message comprising the one scheduler-triggered score or an indication of a score change.

The other application is configured to indicate, in response to receiving the message, that a score change occurred to the user irrespective of whether the user is currently authenticated to the client application.

According to embodiments, the mobile telecommunication device is a battery-powered telecommunication device, e.g. a smartphone or tabloid, a net book or a notebook.

According to some embodiments, the score is a technical parameter derived from a machine owned or used by said organization. For example, the user may belong to a technical maintenance service team who visits, repairs and controls machines located at different customers.

According to some embodiments, at least one of the physical objects is a machine communicatively coupled, e.g. via a wired communication line, to the remote systems. The machine repeatedly sends technical parameters, e.g. temperature, error codes, fill level of a fuel tank, amount of consumables left, amount of consumables consumed, energy consumption or the like to the remote system via the communication link. The remote system computes the scores from the technical parameters, the scores being indicative of the current status of the machine. The scores may be computed in response to a request and/or in response to a signal of a scheduler as described herein for embodiments of the invention. For example, the score may indicate if an error or malfunction is observed in the machine or in one of its components, may indicate the number of consumables left, the temperature or energy consumption of the machine or the like. According to preferred embodiments, the scheduler used for computing the scheduler-driven scores has a frequency of score computation of one computation per one or more minutes or per one or more seconds. Embodiments of the invention used in the context of field-based maintenance and repair may be particularly advantageous as the maintenance staff is notified immediately, via the social media service, if any action performed on the machine in order to repair an error actually solved the problem, had no effect or may have even worsened the state of the machine. In addition, the maintenance staff is able to compare, via the GUI of the client application, the scores said particular machine had at the last visit or at the last explicit request for score information with the currently received scores. Thereby, the maintenance staff may easily recognize trends regarding e.g. wear and tear of the machine compared since the last visit and/or effects of any maintenance or repair work on the state of a particular machine.

According to other embodiments, the scores are prices of products that are to be sold by a field sales representative to a particular organization, e.g. to a customer of a company having hired the field sales representative. The prices may be specific for a particular customer due to customer-specific discounts. The field sales representative is ensured to be notified of any price change even in case the client application is not permanently opened and running. Moreover, the field sales representative may be enabled to inspect the history of price developments of products a colleague is responsible for that shall be offered or sold to the customer the field sales representative is currently visiting or planning to visit.

According to embodiments, the client application receives authentication data of a user, analyzes the authentication data and authenticates the user or denies the user access to the client application. In case of a successful authentication of the user to the client application, the client application automatically requests up-to-date score information from the remote system by sending the request. The authentication data may comprise, for example, a password, e.g. a PIN, biometric data, e.g. fingerprint information, or other forms of user credentials.

According to embodiments, the computer system further comprises a client device. The client device hosts the client application and is operatively coupled to the server computer via a network.

BRIEF DESCRIPTION OF THE DRAWINGS

In the following embodiments of the invention are explained in greater detail, by way of example only, making reference to the drawings in which:

FIG. 1 depicts a telecommunication system 100 whose components are configured for communicating scoring data over a network 116, e.g. a mobile telecommunication network.

Figure 1:
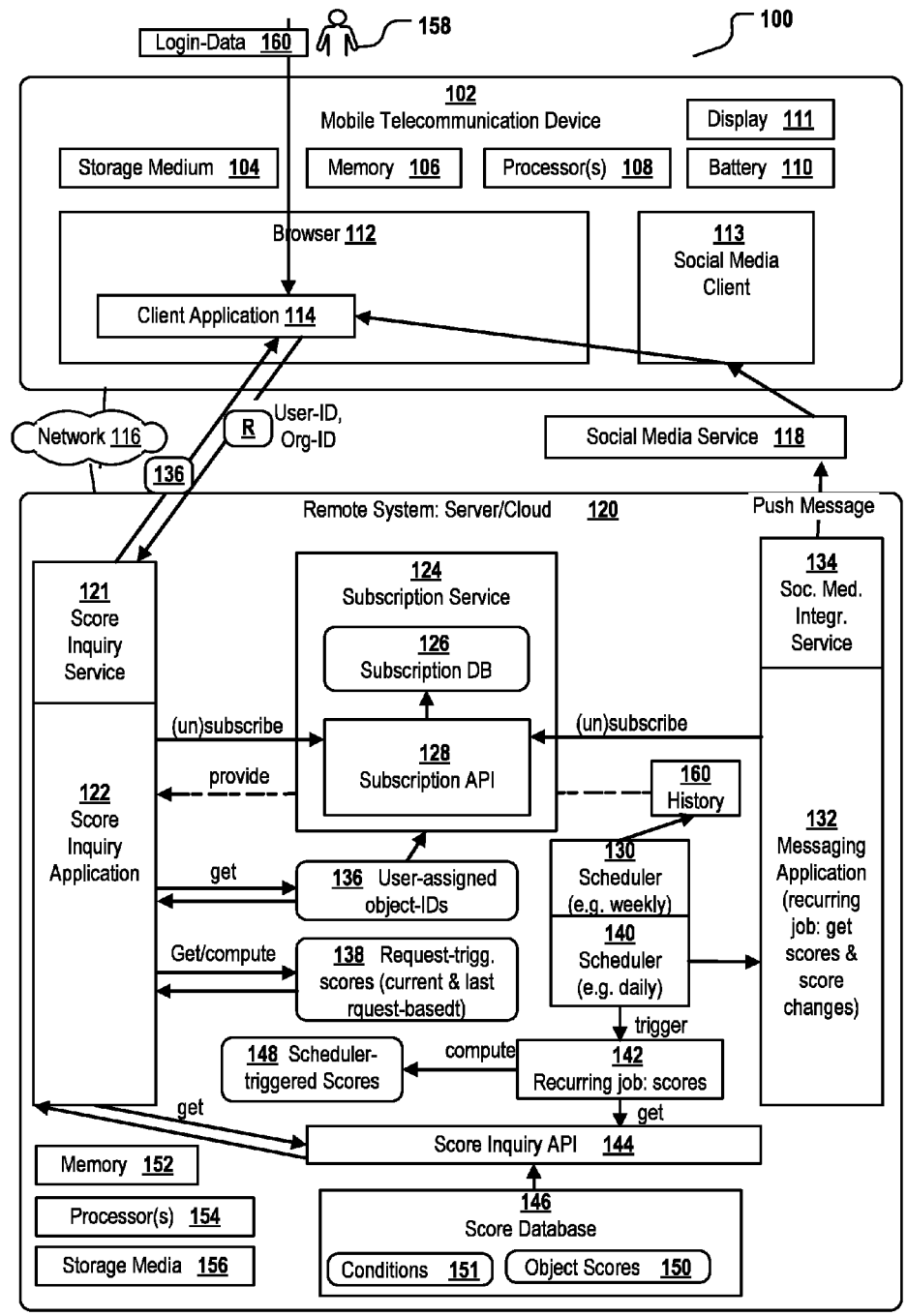
FIG. 1 depicts a distributed system comprising a mobile telecommunication device and a remote system.

The system comprises a mobile telecommunication device 102, e.g. a smart phone, a netbook, a notebook or a tablet PC. The mobile telecommunication device comprises a display 111, an energy source 110, e.g. a battery, a main memory 106, a tangible, non-volatile storage medium 104 and one or more processors 108. The storage medium, e.g. a hard disk drive, comprises computer interpretable instructions which are part of one or more application programs which are installed and/or instantiated on the mobile telecommunication device. For example, a social media client program 113, e.g. a mail client (such as e.g. "Mailbox", "BlueMail", "K-9 Mail" or "Mail" (for iOS), MS Outlook, Thunderbird, etc.) or a social network client (e.g. a facebook app) may be installed on the mobile communication device. The social media client program is interoperable with the social media service 118 (e.g. a mail server, a cloud service providing a social network, a network based groupware or collaboration platform or the like) and is configured to receive messages from the social media service 118.

In addition, a client application 114 may be installed and/or instantiated on the mobile telecommunication device 102. The client application is interoperable with a score inquiry service 121 provided by a remote system 120, e.g. a single server computer or a cloud system comprising a plurality of computers. The client application 114 is configured for sending a request for receiving current score information to the remote system 120 automatically upon a login event of a user 158 who has successfully authenticated himself to the client application by providing some log-in data 160, e.g. a PIN, a passport, biometric data or other credentials. Alternatively, the client application may send the request upon an explicit action of a user having already successfully authenticated to the client application. For example, the explicit action can be the user's act of pressing a button provided by a graphical user interface (GUI) of the client application.

The request comprises at least an identifier (ID) of the user 158 and may optionally comprise further data, e.g. an identifier of an organization the user plans to visit or is currently visiting.

A browser program 112, e.g. Firefox, Chrome, Internet Explorer, Safari, etc. may be installed on the mobile telecommunication device. According to some embodiments, the client application 114 is implemented as a web-based application that is executed in the browser 112. For example, the client application can be implemented as a JavaScript application. According to some embodiments, the client application is a Fiori application. SAP Fiori is a platform that provides the porting of applications on mobile devices. SAP Fiori is based on SAP's technology platform NetWeaver, supports HTML5 and is available for iOS and Android mobile platform.

The telecommunication device 102 is connected via a network 116 to the remote system 120. The network can be, for example, a cellular network or mobile network, you i.e., a communication network where the last link is wireless. The network may be distributed over land areas called cells, each served by at least one fixed-location transceiver, known as a cell site or base station. This base station provides the cell with the network coverage which can be used for transmission of voice, data and others. In a cellular network, each cell uses a different set of frequencies from neighboring cells, to avoid interference and provide guaranteed bandwidth within each cell. When joined together these cells provide coverage over a wide geographic area.

The remote system, e.g. a server system or cloud system comprises a main memory 152, one or more processors 154, one or more storage media 156 and comprises or is operatively coupled to a score database 146. The database can be, for example, a relation store or a column store database. The database may be managed by a DBMS, e.g. SAP Hana, MySQL, PostgreSQL or the like. The database comprises a plurality of scores 150 stored in association with identifiers of respective physical objects and/or comprises conditions 151 and other data that may be used as input by a score calculation program, e.g. the score inquiry program 122, for computing and outputting user-specific object scores 136.

The remote system comprises a score inquiry application programming interface (API) 144 which allows other modules, e.g. the score inquiry application 122 and/or a repeatedly executed score retrieval job module 142, to request and receive computed or predefined scores 150 for one or more physical objects.

The remote system hosts a score inquiry service 121, an application program or technical layer which implements the communication protocol suited for exchanging data with the client application 114. According to some embodiments, the score inquiry service implements multiple different communication protocols suited for exchanging data with different client applications. For example, the score inquiry service may implement the ODATA protocol and may be configured for processing requests submitted by the client application according to the ODATA communication protocol. In addition, the score inquiry service 121 may implement other REST-based APIs. The score inquiry service transforms the request received from the client application into a generic syntax that can be interpreted by the score inquiry application 122 and four lots the request in the generic syntax to the score inquiry application 122.

According to some embodiments, the remote system may comprise a plurality of different score inquiry applications 122, e.g. different applications for computing different types of scores. In this case the score inquiry service 121 may be configured to map and forward a request for a particular type of score to a respective one of the score inquiry applications.

According to one example, the plurality of score inquiry applications may comprise a first application for computing a status indication value for a first machine, a second application for computing a status indication value of a second machine and a third application for computing a status indication value of a third machine, whereby the first machine may be a cap-cutting device, the second machine may be a machine for capping bottles and the third machine may be an automated conveyor belt for transporting the capped bottles to a further machine for downstream processing.

According to another example, the plurality of score inquiry applications may comprise a first application for computing a price of a product (price inquiry application), a second application program for computing a product availability score, a third application program for computing a sales deal probability and a fourth application program for computing a customer churn rate.

A plurality of users, including user 158, may have registered at the remote system and may have subscribed to one or more physical objects whose respective data and scores are managed and provided by the remote system. The system comprises a subscription service 124 configured to manage the subscriptions of a plurality of users 158 to a plurality of different physical objects. For example, the subscription service may comprise subscription API 128 that enables the score inquiry application 122 and/or a messaging application 132 to access a subscription database 126 of the subscription service 124.

The subscription database may comprise an assignment of user-IDs to IDs of physical objects. According to some embodiments, the subscription database 126 further comprises an assignment of user-IDs to organization-IDs, whereby the assignment may imply, for example, that the user is responsible for resolving tasks related to physical objects which are located at a particular organization or which shall be provided to said organization.

According to embodiments, the user is enabled, via a user interface of the client application 114 and the subscription API 128, to modify the assignments of his user-ID in the subscription database 126 to the physical objects and/or to the organizations. In addition or alternatively, the user is enabled via a social media service, e.g. via a configuration email or any other means of communication via the social media service 118, to modify the assignment of user-IDs and/or object-IDs stored e.g. in the subscription database 126.

Request-Triggered Score Computation

In response to receiving the request, the score inquiry application identifies one or more organizations and one or more physical objects assigned to the user-ID of the user. The identification of the assigned organization may comprise evaluating the request and identifying the one of the organization whose identifier is contained in the request R. The user 158 may be one of a plurality of users registered by the remote system and having subscribed for one or more physical objects at the subscription service 124. It is possible that multiple users have subscribed to disjoint, overlapping or identical sets of physical objects or object types.

The score inquiry application 122 is configured, in response to receiving a request comprising a user-IDs of the user 158 having successfully authenticated to the client application 114, to access the subscription service 124 and to retrieve ID(s) of the physical objects 136 the user has subscribed to (i.e., retrieve the ID(s) of the objects or object types which are specifically assigned to said user.

The score inquiry application 122 is further configured, in response to receiving the request, to compute a current, request-triggered score 138 for at least one identified physical object, whereby the score may depend on the organization identified in response to said request. The scores may be computed by retrieving them from the score database via the score inquiry API or by retrieving some conditions and a base score from the database 146 and using said conditions and the base score for computing the current request-triggered score 138.

The computing of the request-triggered score is performed selectively for each of the identified physical objects. Thereby, the score inquiry application stores a timestamp in association with each computed score 138. The scores 138 are stored at least until the further next request for score calculation for a particular organization is received, so the scores 138 comprise at least the time-stamped scores computed in response to the current request and the time-stamped scores computed in response to the previous request of the same user for the same organization and the same physical object.

For example, the organization identified in response to the request may be identified as the one single organization assigned to the user 158 in the subscription database 126. In addition or alternatively, the request may comprise an identifier of the one particular organization for which the product scores shall be obtained. In some example implementations, the identified organization is an organization the user is currently visiting or plans to visit in the future. In order to compute the scores for a particular organization, the score inquiry application 122 is configured to retrieve, via the score inquiry API 144, object scores 150 and/or conditions 151. The retrieved scores and/or conditions are used by the score inquiry application to compute the request-triggered scores 136. One or more of the conditions 151 may be specific for a particular object, object type and/or for a particular organization.

The score inquiry application checks if one of the computed request-triggered scores 138 differs from a request-triggered score 138 having been computed in response to the most recently received request of the same user for the same organization and the same physical object. Selectively in case one of the computed scores 138 differs from said previously computed request-triggered score 138, the score inquiry application returns both the currently computed and the previously computed request-triggered scores 138 directly to the client application via the network. The client application displays both scores to the authenticated user.

Scheduler-Triggered Score Computation

In addition, a score computation job or module 142 is configured for retrieving and/or computing scores 148 in response to a regularly emitted trigger signal of a scheduler 140. The scheduler 140 may be, for example, a regularly executed script, an application program or an application program module. The time point of computing the scores 148 does not depend on any log-in action of the user at the client application or on any explicit request submission of the user via the client application. The scheduler-triggered scores 148 are computed for each of the physical objects and their respectively assigned organization irrespective of the receiving of a request of a client application of the user 158 or of any other user having registered at the remote system. The scheduler-triggered scores are computed for each of the plurality of physical objects managed by the remote system irrespective of the user said physical objects are assigned to. Therefore, the scores 148 are also referred to as "scheduler-triggered" or "user-independent" scores. The request-triggered scores can be computed, according to embodiments, in an organization-specific manner. The scores 148 are stored in the score database 146 or in another data structure in a volatile or non-volatile storage medium operatively coupled to the remote system. The repeatedly executed job 142 is triggered by the scheduler 140, e.g. on an hourly or daily basis. The job or module 142 assigns a timestamp to each of the computed scores 148 and stores the timestamp in association with each computed score 148.

After having computed a scheduler-triggered score 148 for a particular physical object or for all physical objects whose IDs are managed by the remote system, a messaging application 132 compares said scheduler-triggered score with a request-triggered score 138 computed most recently for the same organization and the same physical object irrespective of the user to which said physical object is assigned. Upon determining that one of the scheduler-triggered scores differs from the most recently computed request-triggered score computed for one 158 of the registered users and for the same organization and physical object, the messaging application 132 sends a message from the remote system to another application 113, e.g. an e-mail client or a social network client application running on a mobile telecommunication device 102 of the one user 158. The message is sent in a different communication channel than the one that was used for communicating the request R from the client application to the remote system. For example, the message is transformed, by a social media integration service 134, into a syntax that can be interpreted by a social media service 118 used for transferring the message from the remote system to the other application 113. For example, the social media service 118 may be a mail server, the other application 113 may be a mail client and the social media integration service 118 may generate the message in the form of an e-mail. According to other embodiments, the social media service 118 is a social network, the other application 113 is a client application for said social network and the social media integration service is configured to generate a message in a syntax that is interpretable by the social media service 118. The message is transferred to the other application as a push message and the other application is configured to immediately upon receipt of the message notify the user of a score change, e.g. by outputting an optic, acoustic or mechanical (e.g. vibration) signal. According to some embodiments, the social media integration service is implemented by using the Social Media ABAP Integration Library (SAIL).

Figure 6:
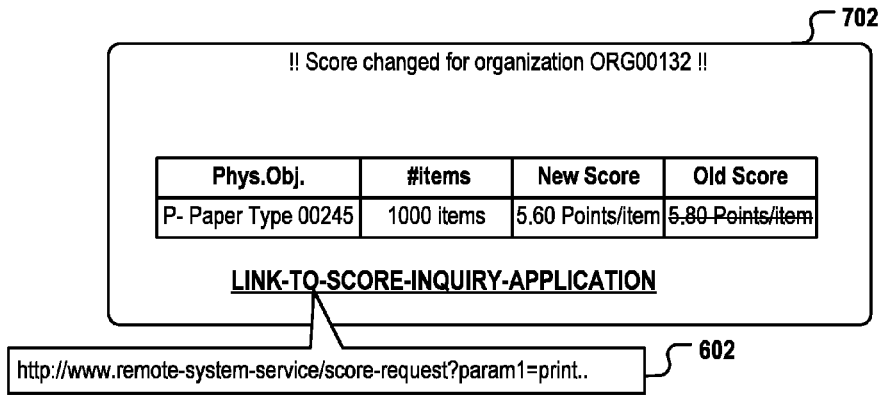
FIG. 6 depicts a social media message indicating a score change.

The message comprises the one scheduler-triggered score and/or an indication of a score change. FIG. 6 depicts an example of said message in form of an e-mail.

The other application receives the message and indicates to a user, irrespective of whether the user has authenticated at the client application 114 or not, that a score change occurred in one of the physical objects to which the user has subscribed.

According to some embodiments, the remote system 120 comprises a further scheduler 130, e.g. a repeatedly executed script, application or module, computes scheduler-triggered scores 148 for any of the physical objects managed by the remote system and stores the computed scores to a history 160. Preferentially, the second scheduler 130 has a lower score computation frequency than the first scheduler. For example, the second scheduler may compute and store scores on a weekly basis. Using the second scheduler may prevent creating large score histories that consume network traffic if communicated to the client via the network.

According to embodiments, the score inquiry application returns, in response to the request R, also the score history computed for each of the physical objects assigned to the organization identified in response to the request (irrespective if the user having submitted the request has subscribed to said object or not). This may allow the user to have at least a rough overview of the scores of products for which a colleague has registered and which may also be relevant for the user having submitted the current request in the context of a task to be solved at a particular organization. This may be helpful e.g. in the case of vacation replacement or in case the inspection of scores of physical objects that are technically related to or have a technical impact on a particular physical object the user is responsible for is helpful for solving problems with said physical object.

Figure 2:
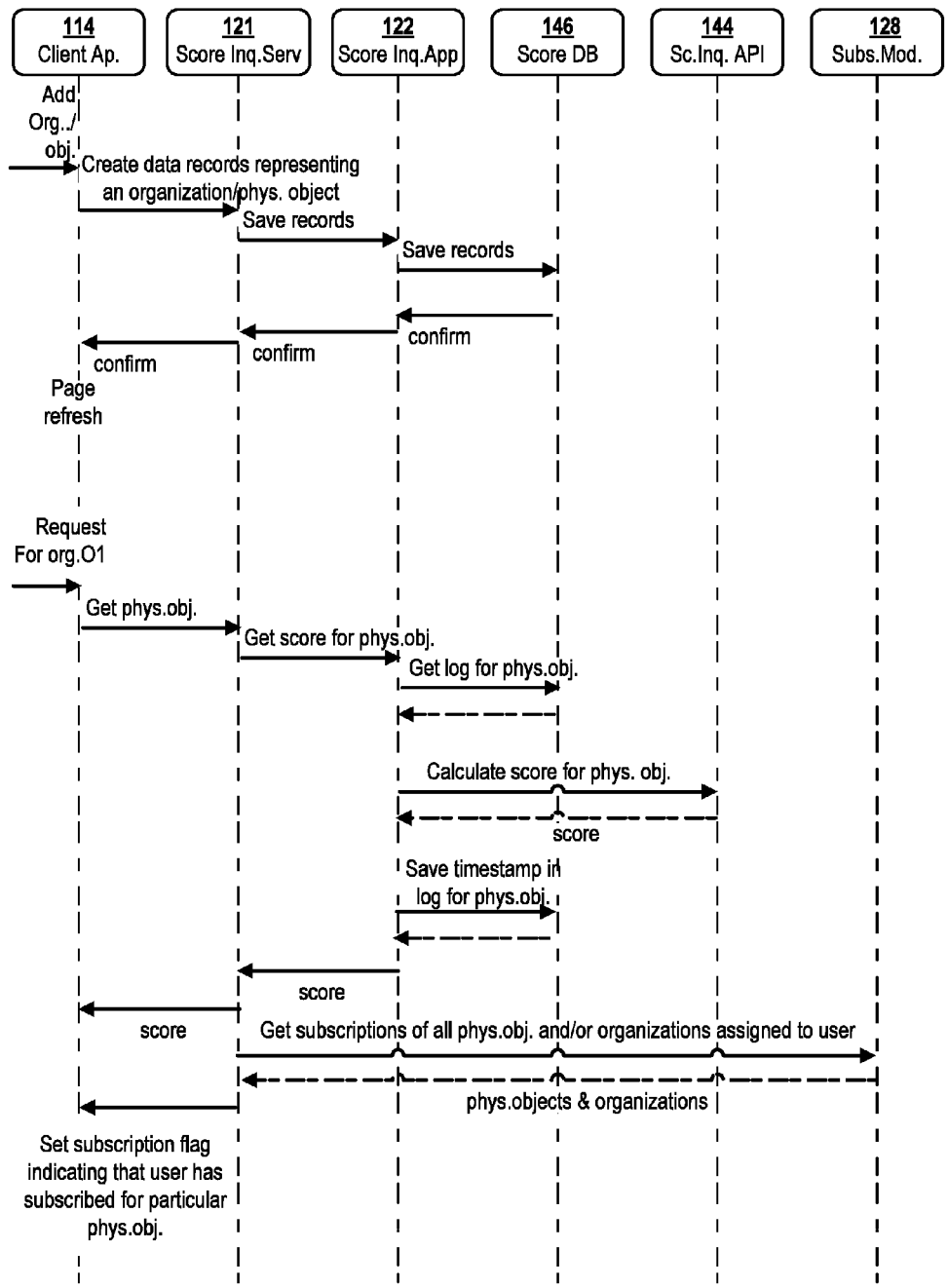
FIG. 2 depicts a sequence of operations for creating a data record representing a physical object and for computing a request-triggered score.

FIG. 2 depicts a sequence of operations for creating a data record representing a physical object and for computing a request-triggered score.

In a first step, the user 158 authenticates to the client application 114 and enters attributes of the physical object to be created. In addition, the user may enter conditions 151 and/or object-organization assignments. The entered data is used for creating a data record representing the created physical object in knowledge base, e.g. the score database 146, of the remote system, and optionally for storing also the conditions and/or associations in the knowledge base. The score inquiry service 121 creates the data record which represents the physical objects to be added to the knowledge base and provides the created data record to the score inquiry application 122 that stores that records or data objects in the score database 146 or another database operatively coupled to the remote system. In the same way, a new data record representing a new organization may be added to the knowledge base. A confirmation message is returned via the score inquiry application and the score inquiry service to the client application 114. The client application, upon receiving the confirmation, automatically performs a page refresh of its GUI to inform the authenticated user that a new data record representing the new organization and/or the new physical object has been added to the knowledge base of the remote system. The client application GUI comprises GUI elements that allow a user to add, modify and/or delete data records representing organizations, physical objects and their respective assignments.

In addition, the GUI of the client application enables the user to subscribe to one or more of the physical objects represented by data records which are managed by the remote system. This enables the user to ensure that he or she is immediately notified via the messaging application 132 and a respective addition program 113 on his client device 102 of any score change of one of the physical objects to which said user has subscribed. According to some embodiments, the GUI elements for subscribing and unsubscribing to the physical objects are displayed only on client devices with a sufficiently large screen, e.g. on desktop computers or tablet PCs.

The user may reach the company's site of an organization O1 and authenticate to the client application. The successful authentication (log-in event at the client application) triggers the submission of a request R to the score inquiry service 121 to identify at least one physical object that is assigned to the organization O1 and to which the user has subscribed via subscription API 128. The score inquiry service 121 transforms this request into a syntax that can be parsed by the score inquiry application 122 and forwards the request to the score inquiry application. The score inquiry application 122 identifies a log, e.g. a "log file", "history" or "history file" or a corresponding set of data records 160 that comprises history score information data that is specific for the one physical object and for the identified organization O1. The score inquiry application 122 receives precalculated scores and/or various conditions and calculates a request-triggered score 138 for the one physical object. The score inquiry application may comprise a plurality of different score computation was which are organization-dependent and which may compute the request-triggered score differently for different organizations. The computed score of the identified physical object is stored in association with a timestamp in the log of the physical object. The request-triggered score may be compared with a score computed in response to a previous request of the same user for the same physical object and the same organization in order to determine if a score change has occurred since the last score computation request of the user, e.g. since the last log-in event of the user to the client application. The currently computed score and optionally also the request-triggered score computed in response to the previous request of the user is returned to the client application 114.

In addition, the score inquiry service 121 may identify one or more further physical objects for which the user has subscribed via the subscription service 124 and/or may identify one or more further organizations to which the further physical objects are assigned. The identified physical objects and organizations are returned to the client application and displayed to the authenticated user 158. The client application assigns a flag to each of the further returned physical objects to indicate whether the user has already subscribed to said physical object or not.

Figure 3:
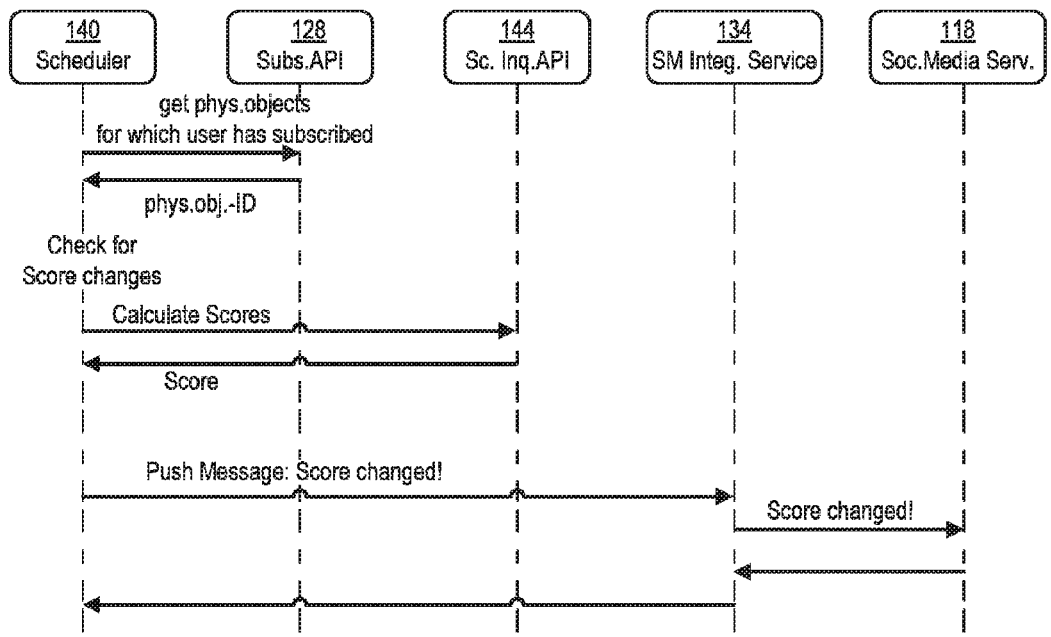
FIG. 3 depicts a sequence of operations for identifying score changes.

FIG. 3 depicts a sequence of scheduler-triggered operations for identifying score changes. In a first step, the scheduler 140 identifies, by sending a request to the subscription API 128, on physical objects to which a particular user has subscribed. Optionally, this step may be performed for each of the plurality of users having registered at the remote system. For the sake of simplicity, the following steps will be described for one exemplary user only. The subscription API returns the one or more physical objects for which the user 158 has subscribed. Optionally, the subscription API 128 may in addition return the identifier of the organization for which a score shall be calculated. However, it is also possible that the request already comprises an identifier of the organization for which the score shall be computed. Then, the scheduler causes a score computation module 142 to compute a scheduler-triggered score for the identified physical object specifically for the identified organization. The score computation comprises receiving basic scores and/or conditions from a score database 146 via the score inquiry API 144. In case the calculated scheduler-triggered score differs from a request-triggered score computed in response to the most recent request of the user for the same organization and physical object, the module 142 or the scheduler 140 cause the social media integration service 134 to generate a message and submit it to a social media service 118. The social media service forwards the message to another application 113 running on the client device 102, e.g. a mail client. The message informs the user that the score of one of the physical objects he or she has subscribed to has changed since the user's last log-in or explicit score request.

FIG. 6 depicts a social media message 702 having the form of an e-mail message. The message is indicative of a score change. It comprises a name of the physical object "printer-paper type 00245", the previously computed request-triggered score 138 "5.80 EUR/unit", a "current" or "new" scheduler-triggered score 148 "5.60 EUR/unit" and optionally some supplementary information, e.g. the minimum number of object items related to a particular task, e.g. "1000 units".

Preferentially, the client-application is implemented as a web-based application, i.e., an application that is executed by the processor of the mobile telecommunication device and that is based on source code that is completely or partially downloaded by a browser via the internet. For example, the client application may be implemented completely or partially as Java-Script application that is downloaded from the remote system or another server system. The message comprises a Link 602 with an URL pointing to the web-based application. The URL may comprise parameters being indicative of a particular score calculation request, user-ID, object-ID and/or organization-ID. The selection of the link by the user 158 automatically loads and instantiates the client application 114 in a browser 112 of the telecommunication device 102. After a successful authentication of the user at the client application, the client application displays further score- and object-related details to the user via a customized GUI. An example for a GUI of a client application specially customized for displaying score and object related information is shown in FIG. 5.

Figure 5:
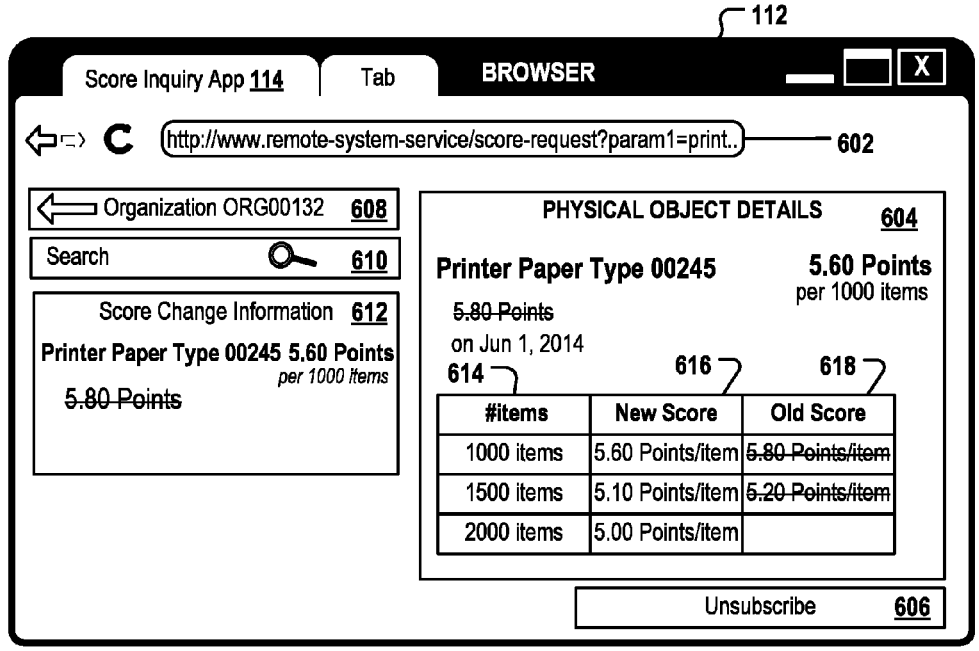
FIG. 5 depicts a web-based implementation of a client application.

FIG. 5 depicts a web-based implementation of a client application 114. The client application may be downloaded to a default browser 112 of the telecommunication device 102 upon a user entering a particular URL 602 into the URL field of the browser or upon a user clicking on a respective link in an e-mail 702 opened in a mail-client 113. The GUI of the application 114 may comprise GUI elements, e.g. HTML and/or CSS-based GUI elements such as buttons 606, 608, links, search fields 610, tables, table columns 614-618 and boxes 612, 604 that are customized for displaying score- and physical object-related information. For example, a click on the button 606 may trigger the cancellation of a subscription of the user 158 for the physical object whose details are currently displayed in box 604 of the GUI. The details may be shown e.g. in a table comprising a column 618 with the outdated, request-triggered scores computed in response to a previous request, a column 616 with the current, request-triggered scores computed in response to a current request R of the client application, and a column 614 indicating the number of object items for which the scores 616, 618—in this case aggregated scores—are computed. For example, the score per physical object item may differ in dependence on the number of physical items considered. The remote system may comprise a predefined set of object item numbers (e.g. 1000, 1500 and 2000 in the depicted example), and each request- and/or scheduler-triggered score computation may comprise the computation of an aggregated request- or scheduler-triggered score.

The box 604 may show the aggregated scores computed for each of a plurality of predefined physical object item numbers while box 612 may solely show the current and the previously computed request-triggered scores for a single object item.

Figure 4:
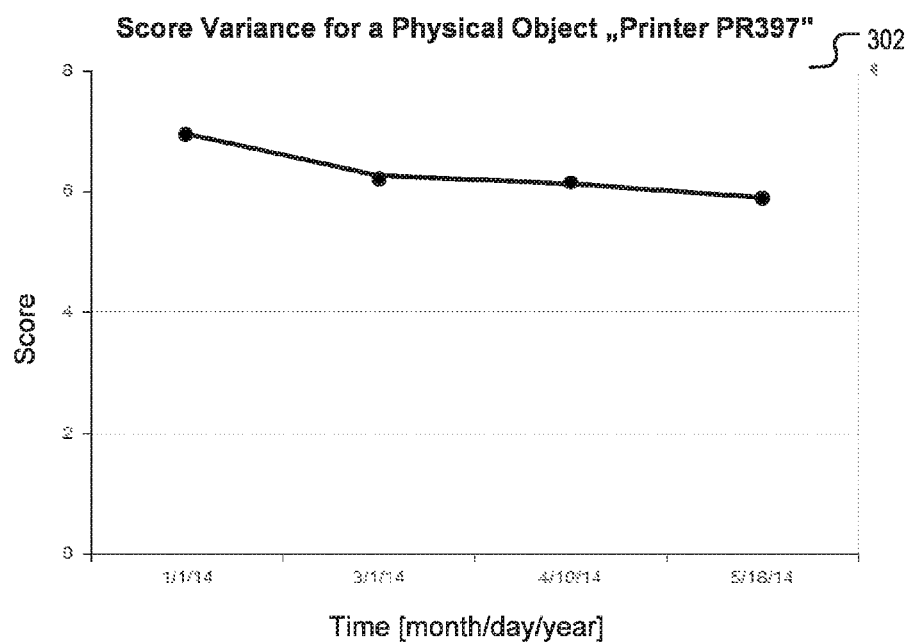
FIG. 4 depicts a score history of one physical object of a particular type.

FIG. 4 depicts a further box 302 or sub-region of the GUI of the client application 114 (that is not shown in FIG. 5). Said further box or sub-region comprises a history of scheduler-triggered scores computed for a physical object to which the user 158 has not subscribed. The further box or sub-region may be displayed only in case the display of the mobile telecommunication device is large enough. Otherwise, the box 302 may be hidden. For example, the user may have subscribed to various physical objects relating to printer paper types, e.g. "printer paper type 00245" but not to printers. A colleague of the user 158 may have subscribed to "printers", e.g. to printer PR397 but not to any "printer paper". The user 158 and his colleague may both be assigned to an organization ORG00132, e.g. may have assigned the task of visiting the organization as field-based employees for checking the quality of the printer paper delivered to the organization or for checking the state and proper functioning of the printers processing the printer paper. In response to a request R of user 158, the request-triggered scores for the printer paper Type 00245 to which user 158 has subscribed is computed specifically for the organization ORG00132, e.g. by evaluating some conditions which may comprise organization-specific conditions. Said scores are depicted in boxes 604 and 612. In addition, the scheduler-triggered score history of the printer PR397 and of any other physical object assigned to the organization ORG00132 whose organization-ID may be specified in the request R is computed and is displayed in box 302 although the user 158 has not subscribed to any printer. Nevertheless, the score history of the printer score as depicted in FIG. 4 may help the user 158 to perform his or her task relating to printer paper Type 00245. As the score history is computed by a scheduler-dependent module for all physical objects represented in the knowledge base of the remote system, the score history is not computed in response to a request R and thus can be returned very quickly. This significantly reduces the response time.

According to other embodiments (not shown in FIG. 4 or 5), the user may be a field sales representative having assigned one or more physical objects, e.g. products, which shall be sold to a particular organization, i.e., to a particular customer. The field sales representative may plan to visit or may currently visit the customer and may therefore authenticate to the client application for triggering the client application to automatically retrieve current score data for the physical object that shall be sold to the customer. The score may be a price of the product to be sold. The aggregated scores displayed in box 604 may be prices computed for a large number of products by taking into account a product number dependent, typically non-linearly growing quantity discount. There may exist customer-specific discounts, shipment costs agreements and so on that may be implemented by the score computation routines of the remote system. The remote system will not only return the current price, it will also return the outdated price that the field sales representative may have offered said customer at his last visit. This may prevent misunderstandings and erroneous offers and cost estimates and reduce network traffic as the user does not have to explicitly search the knowledge base of the remote system by one or more additional requests to make sure the current price is up-to date.

For example, a particular field-based employee may be responsible for selling printer-paper to a particular company C while his colleague is responsible for selling printers to said and other companies. Although the employee does not have the log-in credential of his colleague, the employee may nevertheless act as vacation representation for his colleague and sell printers and printer paper, whereby the employee receives personalized price information for various printer paper types and receives not-personalized price histories for various types of printers normally sold by his colleague.

According to still other embodiments (not shown in FIG. 4 or 5), the user 158 may be member of a field-based technical maintenance staff responsible for checking, maintaining and repairing a machine for capping bottles. The machine receives the bottles from a first conveyer belt and receives the caps from a cap-cutting device.

The machine for capping bottles may be one of the physical objects assigned to the user (i.e., the user 158 has subscribed to the machine for capping bottles) while the cap-cutting device may be assigned to a colleague. The cap-cutting device and the machine for capping the bottles may both be connected via the internet to the remote system and constantly deliver status information and technical parameters to the knowledge base of the company employing the technical maintenance staff.

Due to a technical failure of the machine for capping bottles, the user 158 visits the production line of the bottle making company and logs into his client application. Thereby, the user 158 triggers the submission of a request for a current score for the machine for capping bottles and also for a respective score the user 158 received for said particular machine on occasion of his last visit at the bottle making company half a year ago. The current and the previously received score are indicative of the wear of a machine component of the bottle capping machine that is known to deteriorate with use. The score may be binned in a way that a score change is computed only in case of a significant deterioration of the material of the component. In fact, a plurality of scores respectively indicating the state of a component of the machine may be requested and any change of scores relative to the scores obtained at a previous visit of the user are displayed in box 604 of the GUI of the client application. The aggregated scores can be derivative scores which are indicative of an aggregated degree of wear of multiple functionally connected machine components.

In the given example, the box 302 may display a score value that is associated with the cap cutting machine, i.e., a physical object the user 158 has not subscribed as he is not responsible for maintaining cap cutting machines. However, the score of the cap cutting machine may indicate an error state, the degree of wear or the availability of metal sheets from which the caps are cut out. Any error of a component of the cap cutting machine may result in erroneously shaped caps which may affect the operability of the machine for capping the bottles. By retrieving the score history of the cap cutting machine and the displaying of said history in box 302 in addition to the retrieval and displaying of the request-triggered scores relating to the bottle capping machine, the user 158 may easily decide if the technical problems of the bottle capping machine are a consequence of an error in the cap cutting machine or not.

In a further beneficial aspect, it should be noted that especially for complex machines, the repair process is often based on a trial and error approach and any action of the maintenance personnel may result in a heavy and unforeseeable deterioration of the system state of the whole machine. Provided the scheduler 140 has appropriately short recurrence intervals, e.g. in the range of seconds or minutes, the scheduler 140 may immediately alert the repair staff via the social media service 118 if one of the "repair actions" actually resulted in a change in the state of the machine (and, correspondingly, in a scheduler-triggered score) that indicates a massive deterioration or improvement of the machine state. Thus, the combination of a request-triggered score computation in combination with the provision of a score history of related machines allows the user 158 to identify the source of the failure of the bottle capping machine more quickly and more accurately. The combination of the retrieval of the request-triggered scores with a scheduler-triggered score calculation may be particularly beneficial for providing immediate feedback of the success of an action having been performed on a machine in order to repair said machine in a context where the machines automatically report state-related technical parameters (e.g. temperature, availability of consumables, a mechanical blockade, etc) to the remote system and where said technical parameters are used as input by the remote system for computing scores being indicative of respective machine states.

It should be noted that although all machines of the bottle making company may be connected to the remote system via a wired and stable internet connection, the technical maintenance staff typically operates with mobile telecommunication devices which may often have only an instable network connection of limited bandwidth.

Figure 7:
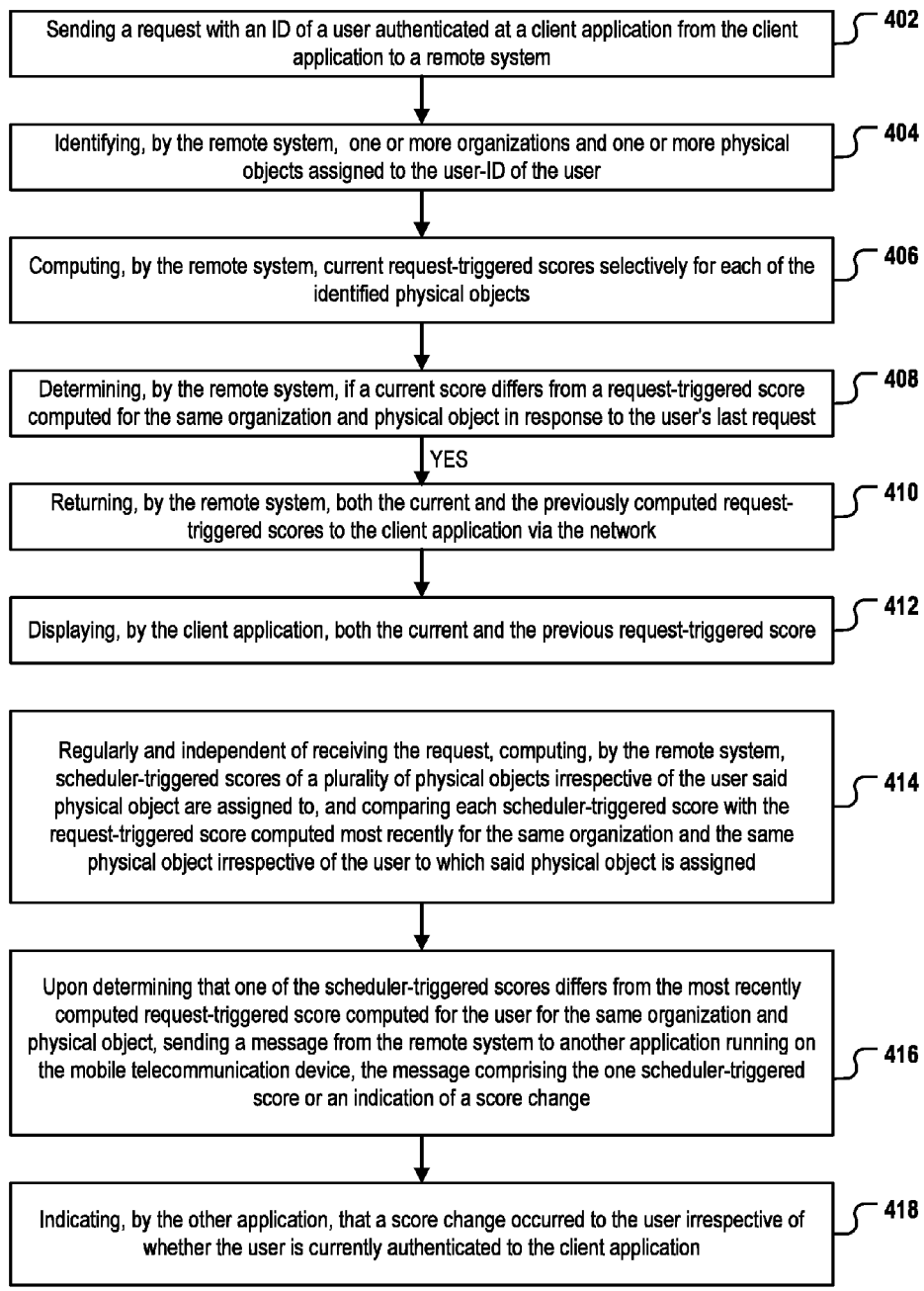
FIG. 7 depicts a flow chart of a method of an embodiment of the invention.

FIG. 7 depicts a flow chart of a telecommunication method for communicating scoring data over a network 116 according to an embodiment of the invention. The method is implemented by components of a system 100 as depicted in FIG. 1.

In a first step 402, a web-based client application 114 of a mobile telecommunication device 102 that is assigned to a user 158 sends a request R of the user 158 to a remote system 120 via the network. The request comprises a user-ID of the user who has successfully authenticated to the client application. Any non-authenticated user is prohibited by the client application from causing the client application to send the request. In response to receiving the request, the remote system identifies in step 404 one or more organizations and one or more physical objects assigned to the user-ID of the user. The user is one of a plurality of users registered by the remote system. In step 406, the remote system computes current, request-triggered scores 138 selectively for each of the identified physical objects, thereby storing a timestamp in association with each computed score. Selectively in case one of the current request-triggered scores 138 differs from a request-triggered score computed in response to the last request of the same user 158 for the same organization and the same physical object, the remote system in step 410 returns both the current and the previously computed request-triggered scores to the client application via the network. In step 412 the client application displays both the current and the previous request-triggered score to the authenticated user.

The remote system 120 computes 414 scheduler-triggered scores 148 of a plurality of physical objects regularly and independent of receiving the request. Said computation is performed irrespective of the user said physical object are assigned to. The remote system stores the scheduler-triggered scores in association with a timestamp and compares each scheduler-triggered score with the request-triggered score computed most recently for the same organization and the same physical object irrespective of the user to which said physical object is assigned. Upon determining that one of the scheduler-triggered scores differs from the most recently computed request-triggered score computed for one 158 of the plurality of registered users for the same organization and physical object, the remote system in step 416 sends a message to another application 113 running on the mobile telecommunication device. The message comprises the one scheduler-triggered score or an indication of a score change.

In response to receiving the message, the other application indicates in step 418 to the user 158 that a score change occurred. The indication is performed irrespective of whether the user is currently authenticated to the client application or not. This may save computational resources and extend battery life time as the user is not required to instantiate the client application program, e.g. a specially adapted program for score retrieval, management and display, in order to be notified of a score change.

Embodiments of the present disclosure can be implemented in digital electronic circuitry, or in computer hardware, firmware, software, or in combinations of them. The system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Method steps associated with the present system can be performed by one or more programmable processors executing a computer program to perform functions of the invention by operating on input data and generating output. Method steps can also be performed by, and apparatus of the present disclosure can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry. To provide for interaction with a user, the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. The present system can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the invention, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on respective computers and having a client-server relationship to each other.

The present system has been described in terms of particular embodiments. Other embodiments are within the scope of the following claims. Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

The invention claimed is:

1. A telecommunication method for communicating scoring data over a network, comprising:
   sending, by a client application of a mobile telecommunication device, a request (R) of a user to a remote system via the network, the request comprising a user-ID of the user having authenticated to the client application;
   in response to receiving the request, performing, by the remote system:
   identifying one or more organizations and one or more physical objects assigned to the user-ID of the user, the user being one of a plurality of users registered by the remote system;
   computing current, request-triggered scores selectively for each of the identified physical objects, thereby storing a timestamp in association with each computed score;
   selectively in case one of the current request-triggered scores differs from a request-triggered score computed in response to the last request of the same user for the same organization and the same physical object:
   returning, by the remote system, both the current and the previously computed request-triggered scores to the client application via the network;
   displaying, by the client application to the authenticated user, both the current and the previous request-triggered score;
   regularly and independent of receiving the request, computing, by the remote system, scheduler-triggered scores of a plurality of physical objects irrespective of the user said physical object are assigned to, thereby storing a timestamp in association with each scheduler-triggered score, and comparing each scheduler-triggered score with the request-triggered score computed most recently for the same organization and the same physical object irrespective of the user to which said physical object is assigned;
   upon determining that one of the scheduler-triggered scores differs from the most recently computed request-triggered score computed for the user for the same organization and physical object, sending a message from the remote system to another application running on the mobile telecommunication device, the message comprising the one scheduler-triggered score or an indication of a score change; and
   in response to receiving the message, indicating, by the other application, that a score change occurred to the user irrespective of whether the user is currently authenticated to the client application.

2. The telecommunication method of claim 1, wherein in case none of the current request-triggered scores differs from the request-triggered score computed in response to a previous request of the same user for the same organization and the same physical object, the remote system selectively returns the current request-triggered scores or selectively returns an indication that the score of a particular physical object has not changed.

3. The telecommunication method of claim 2, the client application being configured for:
   caching a plurality of request-triggered scores received from the remote system in response to a plurality of requests; and
   in response to receiving the indication that the request-triggered score of a particular physical object has not changed, displaying the cached request triggered scores of said physical object.

4. The telecommunication method of claim 1, the other application being accessible to the user without requiring the user to authenticate to the other application.

5. The telecommunication method of claim 1, the request being submitted by the client application selectively upon the user having successfully authenticated to the client application or upon a user-action that causes the client application to request current score information from the remote system.

6. The telecommunication method of claim 1,
   the computation of the current request-triggered scores comprising computing an aggregate score for each of a plurality of physical object item numbers, the computed aggregate scores non-linearly correlating with the number of physical object items for which the score is aggregated;

the returning of the current and most recently computed request-triggered scores to the client application comprising returning, for each of the physical object item numbers, the respectively computed current and most recently computed aggregate score; and the method further comprising displaying, by the client application to the authenticated user, the returned aggregated scores for each of the physical object item numbers.

7. The telecommunication method of claim 1, the request further comprising an organization-ID, the request-triggered and the scheduler-triggered scores being organization-specific scores, the organization-specific, request-triggered scores being computed and returned to the client application selectively for physical objects assigned to the organization whose ID is contained in the request.

8. The telecommunication method of claim 1, the request further comprising a organization-ID, the method further comprising:

in response to receiving the request, performing, by the remote system:

identifying one or more further physical objects assigned to the organization-ID in the request and being unassigned to the user-ID in the request;

retrieving a score change history for each of the identified further physical objects, the history being indicative of all request-triggered and scheduler-triggered scores having been computed for a particular physical object in the past; and returning each of the retrieved score change histories via the network to the client application; and displaying each of the score change histories received from the remote system by the client application on a display of the mobile telecommunication device.

9. The telecommunication method of claim 8, the remote system comprising:

a first scheduling module being configured for regularly and independent of the receiving of the request triggering the computing of the scheduler-triggered scores for all physical objects assigned to any one of the plurality of registered users and comparing each computed scheduler-triggered score with the request-triggered score computed in response to the most recent request of said user for the same organization and the same physical object; and/or a second scheduling module being configured for regularly and independent of the receiving of the request triggering the computing of the scheduler-triggered scores for creating the score histories for all physical objects assigned to any one of the plurality of registered users.

10. The telecommunication method of claim 1, the computation of the scores and/or aggregate scores being performed in real time.

11. The telecommunication method of claim 1, the client application being configured to:

automatically determining the size of the display of the mobile telecommunication device; and displaying or hiding one or more GUI elements of a GUI of the client application in dependence on the determined size.

12. A computer-readable storage medium comprising computer-interpretable instructions which, when executed by processors of a mobile telecommunication device and a remote system cause the mobile telecommunication device and the remote system to perform a method according to claim 1.

13. A distributed system comprising a mobile telecommunication device hosting a client application and another application and comprising a remote system connected to the mobile telecommunication device via a network, the client application being configured to send a request (R) of a user to the remote system via the network, the request comprising a user-ID of a user authenticated to the client application;

the remote system being configured to perform in response to receiving the request:

identifying one or more organizations and one or more physical objects assigned to the user-ID of the user, the user being one of a plurality of users registered by the remote system;

computing current, request-triggered scores selectively for each of the identified physical objects, thereby storing a timestamp in association with each computed score;

selectively in case one of the current request-triggered scores differs from a request-triggered score computed in response to the last request of the same user for the same organization and the same physical object, returning both the current and the previously computed request-triggered scores to the client application via the network;

the client application being configured to display both the current and the previous request-triggered score returned in response to the request of the authenticated user;

the remote system being configured to regularly and independent of receiving the request:

computing scheduler-triggered scores of a plurality of physical objects irrespective of the user said physical object are assigned to, thereby storing a timestamp in association with each scheduler-triggered score, and comparing each scheduler-triggered score with the request-triggered score computed most recently for the same organization and the same physical object irrespective of the user to which said physical object is assigned;

upon determining that one of the scheduler-triggered scores differs from the most recently computed request-triggered score computed for the user for the same organization and physical object, sending a message from the remote system to another application running on the mobile telecommunication device, the message comprising the one scheduler-triggered score or an indication of a score change; the other application being configured to indicate, in response to receiving the message, that a score change occurred to the user irrespective of whether the user is currently authenticated to the client application.

14. The distributed system of claim 13, the mobile telecommunication device being a battery-powered telecommunication device.

* * * * *